US009787692B2

(12) United States Patent
Peleg et al.

(10) Patent No.: US 9,787,692 B2
(45) Date of Patent: Oct. 10, 2017

(54) NETWORK STORAGE SYSTEM FOR A DOWNLOAD INTENSIVE ENVIRONMENT

(71) Applicant: Reduxio Systems LTD., Petach Tiqva (IL)

(72) Inventors: Nir Peleg, Beer-Yaakov (IL); Or Sagi, Tel-Aviv (IL); Amnon Strasser, Tel-Aviv (IL)

(73) Assignee: Reduxio Systems Ltd., Petah Tiqwa (IL)

( * ) Notice: Subject to any disclaimer, the term of this patent is extended or adjusted under 35 U.S.C. 154(b) by 230 days.

(21) Appl. No.: 14/615,016

(22) Filed: Feb. 5, 2015

(65) Prior Publication Data

US 2015/0149786 A1    May 28, 2015

Related U.S. Application Data

(63) Continuation of application No. 12/405,734, filed on Mar. 17, 2009, now Pat. No. 8,959,199.

(60) Provisional application No. 61/037,390, filed on Mar. 18, 2008.

(51) Int. Cl.
*G06F 15/173* (2006.01)
*H04L 29/06* (2006.01)
*H04L 29/08* (2006.01)

(52) U.S. Cl.
CPC ........ *H04L 63/123* (2013.01); *H04L 63/0428* (2013.01); *H04L 63/0876* (2013.01); *H04L 63/10* (2013.01); *H04L 67/025* (2013.01); *H04L 67/06* (2013.01); *H04L 67/1097* (2013.01); *H04L 63/1408* (2013.01)

(58) Field of Classification Search
CPC ... H04L 63/123; H04L 67/06; H04L 63/0876; H04L 67/025; H04L 67/1097
USPC ............................... 709/200, 224; 713/181
See application file for complete search history.

(56) References Cited

U.S. PATENT DOCUMENTS

| | | | |
|---|---|---|---|
| 4,901,348 A | 2/1990 | Nichols et al. | |
| 5,253,341 A | 10/1993 | Rozmanith et al. | |
| 6,091,710 A | 7/2000 | Mawhinney | |
| 6,356,941 B1 | 3/2002 | Cohen | |
| 6,484,208 B1 | 11/2002 | Hilland | |
| 6,567,847 B1 | 5/2003 | Inoue | |
| 6,681,239 B1 * | 1/2004 | Munroe | G06F 12/109 711/E12.068 |
| 6,757,710 B2 | 6/2004 | Reed | |
| 7,039,713 B1 * | 5/2006 | Van Gunter | H04L 63/08 709/225 |
| 7,069,439 B1 * | 6/2006 | Chen | G06F 21/34 380/251 |
| 7,072,865 B2 | 7/2006 | Akiyama | |
| 7,107,335 B1 | 9/2006 | Arcieri et al. | |

(Continued)

*Primary Examiner* — Anthony Mejia
(74) *Attorney, Agent, or Firm* — Pearl Cohen Zedek Latzer Baratz LLP

(57) ABSTRACT

A network storage system for a download intensive environment is provided. The network storage comprises at least a data storage server (DSS) that includes an interface enabling connection of the DSS to a network at a location that enables at least a view of network transactions performed by a plurality of clients; a storage unit; and a system adapted to monitor the network transactions occurring on the network and identification of the network transactions as belonging to a registered client of the DSS, and storing in the storage the transactions with an identification corresponding to the registered client.

12 Claims, 4 Drawing Sheets

(56) References Cited

U.S. PATENT DOCUMENTS

| | | | |
|---|---|---|---|
| 7,124,305 B2* | 10/2006 | Margolus | G06F 17/30097 707/999.01 |
| 7,249,251 B2 | 7/2007 | Todd et al. | |
| 7,512,719 B1* | 3/2009 | Gillespie | G06F 12/0284 710/10 |
| 7,945,779 B2* | 5/2011 | Martin | H04L 63/123 380/2 |
| 8,346,748 B1* | 1/2013 | Nair | G06F 17/30115 707/706 |
| 8,621,598 B2* | 12/2013 | Lai | H04L 9/3213 719/328 |
| 2003/0023712 A1 | 1/2003 | Zhao et al. | |
| 2003/0074580 A1* | 4/2003 | Knouse | H04L 63/0815 726/4 |
| 2003/0163568 A1* | 8/2003 | Kano | G06F 3/0622 709/225 |
| 2004/0143738 A1* | 7/2004 | Savage | G06Q 20/383 713/168 |
| 2004/0151382 A1 | 8/2004 | Stellenberg et al. | |
| 2004/0153576 A1* | 8/2004 | Hansmann | G06F 17/30902 709/248 |
| 2005/0044365 A1* | 2/2005 | Haukka | H04L 9/0844 713/171 |
| 2005/0076209 A1* | 4/2005 | Proudler | G06F 21/6218 713/165 |
| 2005/0086491 A1* | 4/2005 | Haugh | G06F 21/6236 713/182 |
| 2005/0091229 A1 | 4/2005 | Bali et al. | |
| 2005/0114291 A1 | 5/2005 | Becker-Szendy et al. | |
| 2006/0047531 A1 | 3/2006 | Leung et al. | |
| 2006/0259949 A1* | 11/2006 | Schaefer | G06F 17/30082 726/1 |
| 2007/0011450 A1 | 1/2007 | McCreight et al. | |
| 2007/0061572 A1* | 3/2007 | Imai | H04L 9/0891 713/169 |
| 2007/0116268 A1 | 5/2007 | Kasahara et al. | |
| 2007/0143247 A1* | 6/2007 | Brunswig | G06F 17/30557 |
| 2007/0256125 A1* | 11/2007 | Chen | G06F 21/33 726/18 |
| 2008/0045214 A1* | 2/2008 | Wen | H04L 9/3271 455/435.1 |
| 2008/0126434 A1* | 5/2008 | Uysal | G06F 17/30233 |
| 2008/0140660 A1* | 6/2008 | Masuda | G06F 17/3023 |
| 2008/0168469 A1* | 7/2008 | Feingold | G06F 9/466 719/313 |
| 2008/0181107 A1* | 7/2008 | Moorthi | G06F 17/30085 370/231 |
| 2009/0100264 A1* | 4/2009 | Futa | H04L 9/0844 713/170 |
| 2009/0132543 A1* | 5/2009 | Chatley | G06F 3/0613 |
| 2009/0228511 A1* | 9/2009 | Atkin | G06F 17/30076 |

\* cited by examiner

NETWORK STORAGE SYSTEM FOR A DOWNLOAD INTENSIVE ENVIRONMENT

CROSS REFERENCE TO RELATED APPLICATIONS

This application is a continuation application of U.S. application Ser. No. 12/405,734 filed on Mar. 17, 2009, now allowed, which claims the benefit of U.S. Provisional Application No. 61/037,390 filed on Mar. 18, 2008, the contents of which are herein incorporated by reference.

TECHNICAL FIELD

The present disclosure relates generally to storage systems, and more specifically to network storage systems that are subject to heavy downloads, and even more specifically to systems that enable the sharing of individually encrypted data.

BACKGROUND

In a typical last mile connectivity system upload/download ratios are grossly asymmetrical. Most of the content users acquire or generate is downloaded and not generated locally. In a typical scenario in which a user attempts to store content to a central location, data which has just been downloaded would be uploaded again. Considering the asymmetrical bandwidth ratios this is highly impractical. The asymmetry in the upload versus download bandwidth is evidence to such difference. In systems that are intensive on the download side, it would be advantageous to further provide a network storage system that takes advantage of this asymmetry and harness it to its advantage.

One of the challenges of today has further to do with the sharing of secure data. Such data is difficult to share between two or more users because of the need to ensure that the data is protected from those entities which are not authorized to view such data. While exchange and/or sharing is known in the art to be enabled on particular cases, such as shown in U.S. Pat. No. 6,356,941 incorporated herein merely for the useful understanding of the background of the invention, it requires the creation of a "network vault" for the exchange of secured data. Other solutions require the creation of protected channels for the exchange of such secure shared data. Of particular difficulty is the use of content addressable storage (CAS) when operating on secure data. Existing art explains how to access encrypted data in regularly accessed storage systems, but does not provide an acceptable method for using CAS in conjunction with encrypted data in situations where different users may use different encryption keys.

It would be therefore advantageous to provide a solution that enables the sharing of data in general and the sharing of secured data in particular.

SUMMARY

Certain embodiments disclosed herein include a system and method for directing permanent storage of data by a data storage server (DSS) in a download intensive environment. The system includes a processor; and a memory, the memory containing instructions that, when executed by the processing unit, configure the system to: detect a storage operation on data with respect of a temporary storage; parse a protocol of the storage operation using a respective protocol parser; determine an appropriate stream address of the temporary storage respective of the parsed protocol; determine if the detected storage operation matches a storage operation on a user storage that is associated with a registered client of a virtual file system; and send a request to the DSS to permanently store the data on a back-end storage (BES), wherein the request includes at least the appropriate stream address upon determination that the detected storage operation matches a storage operation on the user storage.

Certain embodiments disclosed herein also include a system and method for directing permanent storage of data by a data storage server (DSS) in a download intensive environment. The system comprises a processor; and a memory, the memory containing instructions that, when executed by the processing unit, configure the system to: monitor transactions over a network communicatively connected to the DSS to identify a network transaction of transactional data by a transacting client; upon identification of the network transaction, determine whether there is a match between the transactional data and a previously stored data associated with at least one subscribed client; upon determining a match, send a challenge to at least a challenged client; receive a response from each of the at least a challenged client; determine, based on the response, whether the received response is valid; and upon determining that the received response is valid, subscribe the transacting client to the previously stored data.

BRIEF DESCRIPTION OF FIGURES

The subject matter disclosed herein is particularly pointed out and distinctly claimed in the claims at the conclusion of the specification. The foregoing and other features and advantages of the disclosed embodiment will be apparent from the following detailed description taken in conjunction with the accompanying drawings.

DETAILED DESCRIPTION OF EMBODIMENTS

Figure 1:
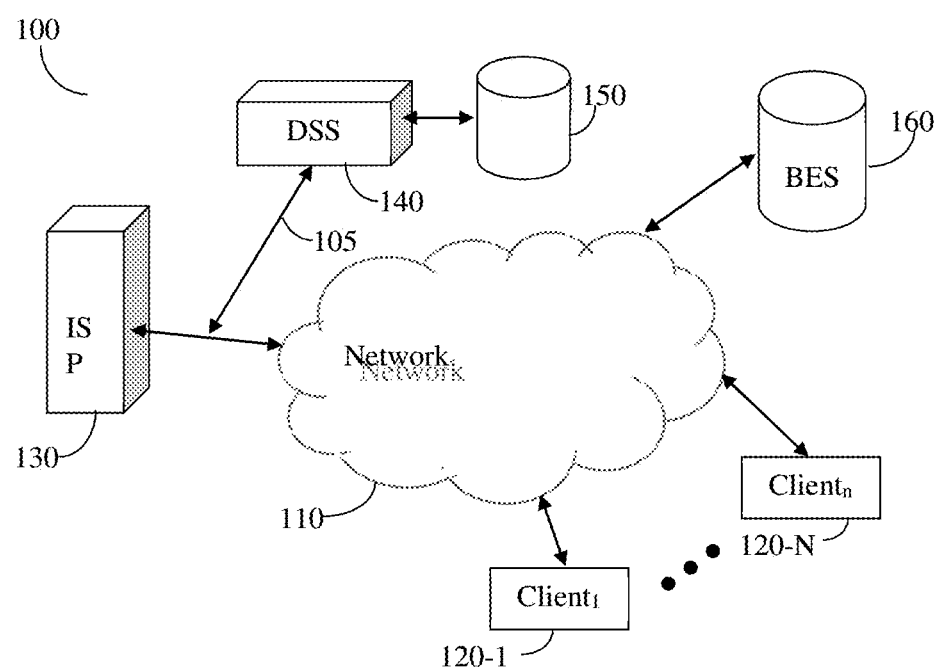
FIG. 1 is a system implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments disclosed herein a data storage server (DSS), typically positioned on the Internet service provider (ISP) side of the wire for sharing of secured data is provided. In accordance with one embodiment, that the DSS acts as a router/bridge and has visibility of all downloaded data. By providing proper hints from the client, a store operation can refer to a block previously seen on the network down channel. A virtual file system on the client side, or some other client-side software module, can provide those software hints, as well as represent the stored data in a conventional file based manner. In another embodiment includes the use of content addressable storage (CAS) to include the handling of secured data.

In accordance with another embodiment the sharing of data otherwise secured between two or more entities is enabled, thereby saving storage system space and decreasing overall access time.

FIG. 1 shows an exemplary and non-limiting network system 100, implemented in accordance with an embodiment. The network system 100 consists of a data storage server (DSS) 140 positioned as "a bump on the wire" on the internet service provider (ISP) 130 side. Once initialized by one of clients 120-1 through 120-N (collectively referred to as clients 120), the DSS 140 stores all the data related to that client 120, indexed with a Client Identification (CID) to a temporary storage 150, coupled to the DSS 140. Each data stream is addressable by a byte offset from the CIDs epoch. The network system 100 further consists of a back-end storage (BES) 160 pool. The client's 120, ISP 130, and BES 160 are all coupled via a network 110, the network may be a local area network (LAN), a wide area network (WAN), the world-wide web (WWW) and other types of networks as may be applicable.

Each client 120 further comprises a monitor (not shown) that monitors all the data received on the down channel to a client 120, and correlates it to storage operations performed by a user on a virtual file system. When a store operation matches a payload to a previously monitored data packet, the client 120 monitor requests the DSS 140 to permanently store the data previously stored on the temporary storage 150 on the BES 160 pool by providing the appropriate stream addresses, rather than uploading an entire data packet. The client 120 correlates the data received from the user in a storage operation to the proper byte-stream addresses. This is achieved by maintaining an association of content to byte-stream addresses in which content may be abbreviated by the use of a checksum function. In order for the monitor to isolate the payload from the control for all such data the monitor must perform on-the-fly protocol parsing. The monitor implements multiple protocol parsers for commonly used protocols. These include, but are not limited to protocols such as Simple Mail Transfer Protocol (SMTP), bittorrent, eMule, File Transfer Protocol (FTP), Hypertext Transfer Protocol (HTTP), and Post Office Protocol version 3 (POP3). The client's monitor may be further enabled to cope with out of order packet delivery.

Figure 4:
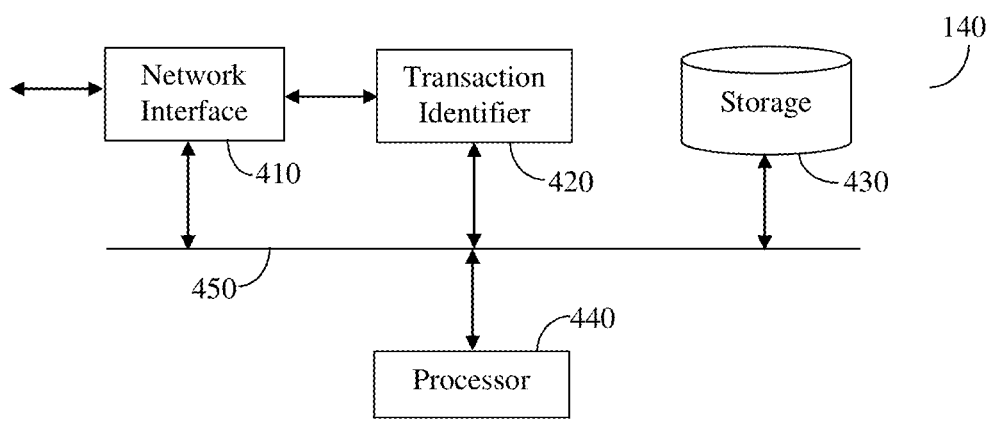
FIG. 4 is a schematic block diagram of a DDS constructed in accordance with an embodiment.

An exemplary and non-limiting block diagram of a DSS 140 is shown in FIG. 4. A network interface 410 enables the interface to a network and is coupled to a transaction identifier unit (TIU) 420 and to a DSS bus 450. The TIU 420 is further coupled to the DSS bus 450. A processor 440 is also coupled to the DSS bus 450 as well as storage 430. The processor 440 and TIU 420 together perform the tasks of at least monitoring the network transactions occurring on the network and identification of the network transactions. In one embodiment the TIU 420 is implemented by the processor 440. In some embodiments the storage 150 is part of the DSS 140.

Figure 2:
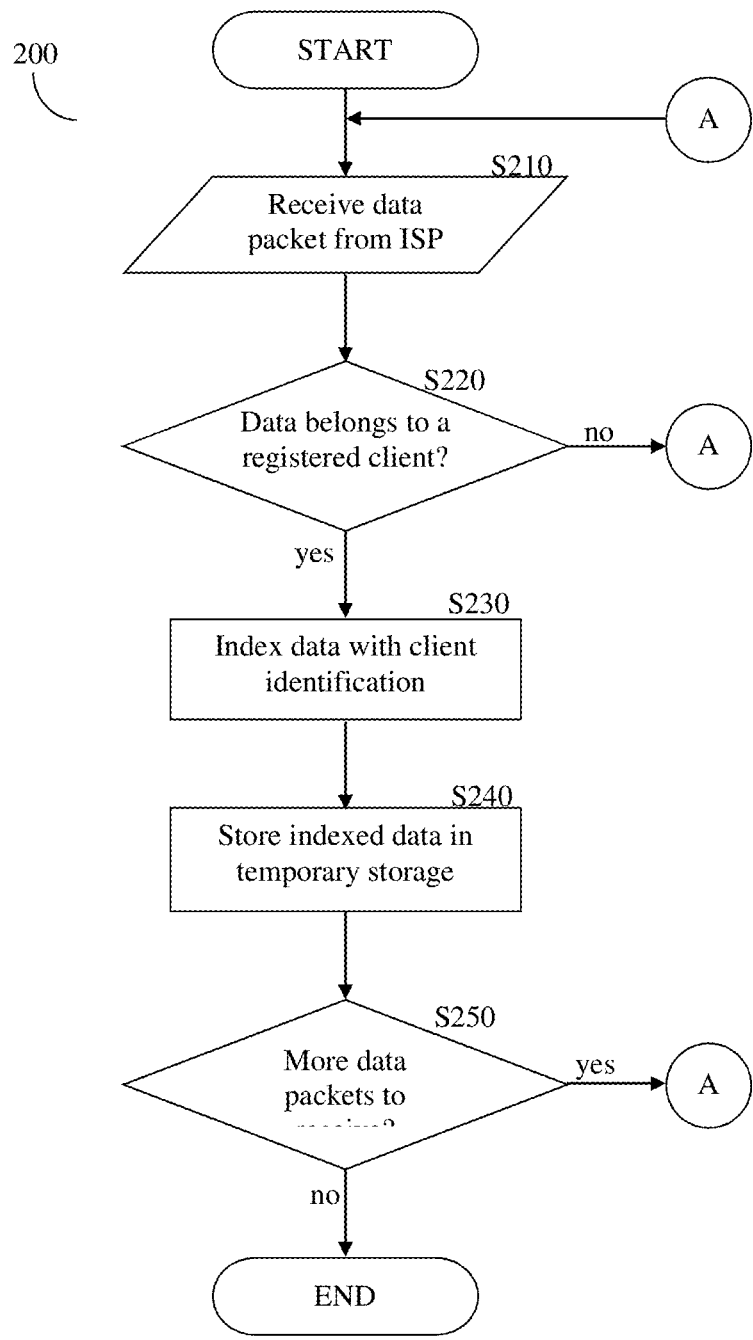
FIG. 2 is a flowchart describing the operation of the DSS realized in accordance with an embodiment.

FIG. 2 shows an exemplary and non-limiting flowchart 200 describing the operation of the DSS 140 in accordance with an embodiment. In S210, a data packet is received from the ISP line, as further described above. In S220, is it checked whether the data belongs to an already registered client, and if not the method continues with S210; otherwise, the method continues with S230. In S230 the data is indexed with the CID of the specific client 120 to which the data belongs. In S240, the data is stored in the temporary storage 150. In S250, it is checked whether more data is to be received, and if so the method continues with S210; otherwise, the method ends.

Figure 3:
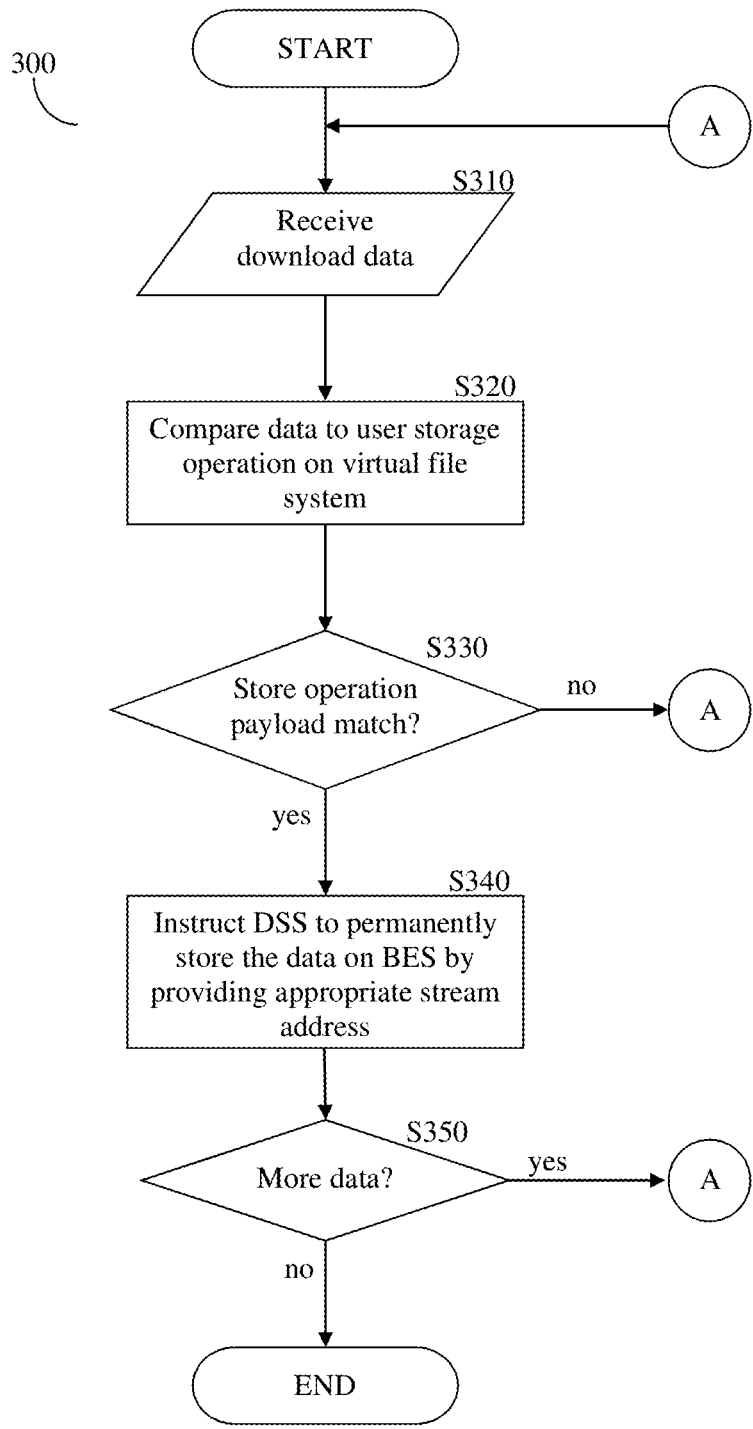
FIG. 3 is a flowchart describing the operation of a client monitor realized in accordance with an embodiment.

FIG. 3 shows an exemplary and non-limiting flowchart 300, describing the operation of a client's 120 monitor in accordance with an embodiment. In S310 download data is received. In S320 the (payload) data is compared to the user storage on its respective virtual file system. In S330, is checked whether there is a match, and if so, the method continues with S340; otherwise, the method continues with S310. In S340, the DSS 140 is instructed to permanently store the data, now on the temporary storage 150, on the BES 160, by providing the appropriate stream address. In S350, it is checked whether more data is to be received, and if so the method continues with S310; otherwise, the method terminates.

In one embodiment, the BES 160 is implemented as a content addressable storage (CAS) system. This typically allows for better utilization in many common scenarios where multiple clients store identical content, including but not limited to, storage of peer-to-peer (P2P) downloaded content. Data shared between multiple clients 120 would be therefore stored only once on the BES 160 thereby providing the advantages of the disclosed embodiments.

In an obfuscated channel environment such as a virtual private network (VPN), the client 120 has the ability to decrypt the data. In accordance with an exemplary embodiment, the DSS 140 is not required to have that ability. In order to access the encrypted data, the client 120 should store sufficient state allowing it to decrypt the data when retrieved. The specific state that needs to be stored depends on the encryption mechanism and is considered to be outside the scope of the disclosed embodiments.

Storing encrypted data naturally hampers the efficiency of a CAS DSS 140. Therefore, when storing obfuscated data, resulting from either an obfuscated communication channel as elaborated earlier or from client-side encryption, the DSS 140 implements a proprietary secure sharing mechanism (SSM). This enables sharing between clients 120 having the same data while keeping the data opaque to other clients. This is achieved by having a client 120 store digest values in addition to data objects. The digest values are stored for the clear, rather than the encrypted data. The DSS 140 is not aware of the association between digest values and data objects. At the DSS 140 side, digest values are mere hints for triggering a data sharing operation. When the DSS 140 receives a store request for an already stored digest, the DSS 140 refers the storing client 120 to one or more previous clients 120 which have stored that digest in the past. The client's 120 may then, using direct communication, which does not necessarily have to involve the DSS 140, negotiate key exchange or re-encryption of the same data with a common key, which may or may not require re-encryption as the case may be. This is done once the negotiating clients 120 are satisfied that they indeed share the same data and hence can also share the encryption key.

Following are several non-limiting examples of the operations possible with respect to the network system 100. In the following examples the notation 'C' is for the client 120, and the notation 'S' is for DSS 140. A Store operation shall be performed as follows:

C→S: Array {
    Stream
    Byte offset

```
Length
}
S→C: Retrieval Key/error code
```

As demonstrated above, the DSS 140 receives from a registered client 120 a Store operation including an array that consists of a stream, a byte offset and a length. Responsive of the store operation, the DSS 140 sends to the registered client 120 a retrieval key or an error code. The DSS 140 may respond with an "offset not logged" as a legitimate error code. If this condition occurs, the client 120 may choose to transmit the data to the DSS 140 and retry the operation. The storing client 120 may also implicitly subscribe to the data in the manner discussed in more detail below.

Retrieval operation of data may be performed in the following process:

```
C→S: Array {
    Retrieval key
    Offset
    Byte count
    Operation
}
S→C: {
Array {
    Retrieval key
    Byte count/error code
}
Data
}
```

As demonstrated above, the Retrieve operation comprises an array that including of a retrieval key, an offset, a byte count and an operation field. The operation field may specify a simple Get Data operation or a checksum function. The registered client, in response to the retrieve operation, may send to the DSS 140 an array comprising a retrieval key and at least one of a byte count or an error code, and corresponding data.

A client 120 may subscribe to data in the following manner:

```
C→S: n Retrieval keys
S→C: Array {
    Retrieval key
    Ack/error
}
```

This operation is used when a client 120 wishes to join, or otherwise co-own, existing data. That is, the client sends one or more retrieval keys and the DSS 140 responds with retrieval key and one of an acknowledgement or an error code.

In a similar manner a client 120 may also unsubscribe to data as follows:

```
C→S: n Retrieval keys
S→C: Array {
    Retrieval key
    Ack/error
}
```

This operation is only allowed to subscribed clients 120, so as to prevent malicious removal by repeating the operation, as when the referenced content counter goes down to zero, i.e., no more users for the data exist, the DSS 140 may remove the unsubscribed data from storage.

A digest may be stored by the Store Digest that operates as follows:

```
C→S: n Digest values
S→C: Array {
    Digest Value
    Store status (success/failure code)
    Array of clients
}
```

The DSS 1440 sends a registered client an array comprising of a digest value, a store status and an array of registered clients responsive of the storing or removing operation. Digest values are unique to the requesting client 120 and are replied with an empty array of clients 120.

Similarly the Remove Digest operation operates as follows:

```
C→S: n Digest values
S→C: Array {
    Digest value
    Ack/error
}
```

The Start operation operates as follows:
C→S: CID
S→C: Ack/error code
In the Start operation the DSS 140 sends to the registered client an acknowledgement or an error code in response to a CID sent by the client.

The Stop operation operates as follows:
C→S: CID
S→C: Ack/error code
In the Stop operation the DSS 140 sends to the registered client an array acknowledgement or an error code in response to a CID sent by the client.

The Gather operation operates as follows:

```
C→S: Array {
    Retrieval key
    Offset
    Byte count
}
S→C: Retrieval Key/error code
```

The Gather operation includes an array that further comprises a retrieval key, an offset, and a byte count sent by the client to the DSS 140. The DSS sends to the registered client a retrieval key or an error code responsive of receiving the gather operation.

The Have Data operation, an exemplary and non-limiting implementation of which is shown herein below, enables communication between two clients 120 and operates as follows:

C0→C1: Digest Value, Challenge0
C1→C0: Nack, or Ack(Digest Value, Response0, Challenge1)
C0→C1: Nack, or Ack(Digest Value, Response1)
C1→C0: Nack, or Ack(Digest Value, Retrieval Key, Decryption Key)

Basically, when encrypted data is to be shared, both sides have to check that they indeed have identical data. This is performed by sending a challenge which can be met only by those parties having the identical data in question. When both sides have confirmed their respective capability to access identical data, it is then possible to share such data in a single location using a single encryption key. Using this approach allows the use of a CAS for the shared storage of encrypted data. C0 and C1 can switch roles in providing the decryption and retrieval keys, such that C0 sends the encryption keys to C1. Which client 120 provides the keys may be determined by the amount of clients 120 subscribed to each copy of the data. This operation is triggered on the client 120 side by receiving a non-empty array of clients 120 from the DSS 140. It is received as a Store Digest response. Upon successful completion of the operation the client 120 that received the keys can delete its own copy of the stored data, if such exists, since it is now using the copy encrypted and stored by the other client 120. The client 120 may verify the authenticity of the keys by using a Retrieve operation with a checksum field. This can be used to protect against an attack scenario in which the keys exchanged, after trust establishment, fail to retrieve the original data.

The various disclosed embodiments may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for directing permanent storage of data by a data storage server (DSS) in a download intensive environment, comprising:
a processor; and
a memory, the memory containing instructions that, when executed by the processor, configure the system to:
detect a storage operation on data with respect of a temporary storage;
parse a protocol of the storage operation using a respective protocol parser;
determine an appropriate stream address of the temporary storage respective of the parsed protocol;
determine if the detected storage operation matches a storage operation on a user storage that is associated with a registered client of a virtual file system;
send a request to the DSS to permanently store the data on a back-end storage (BES), wherein the request includes at least the appropriate stream address upon determination that the detected storage operation matches a storage operation on the user storage; and
upon receiving a request for the data from the temporary storage:
cause a first client to send a digest value and a first challenge value to a second client;
cause the second client to send an acknowledgment to the first client, the acknowledgement comprising: the digest value, a first response, and a second challenge;
cause the first client to send the digest value and a second response;
cause the second client to send the digest value, a retrieval key, and a decryption key;
cause the first client to delete encrypted data corresponding to the digest value, wherein access by the first client to encrypted data of the second client is enabled by the retrieval key and the decryption key.

2. The system of claim 1, wherein the protocol of the storage operation is any of: a Simple Mail Transfer Protocol (SMTP), bittorrent, eMule, a File Transfer Protocol (FTP), a Hypertext Transfer Protocol (HTTP), and a Post Office Protocol version 3 (POP5).

3. The system of claim 1, wherein the system is further configured to: cope with out of order packet delivery.

4. The system of claim 1, wherein the BES is a content addressable storage (CAS).

5. The system of claim 1, wherein the system is further configured to:
upon receiving a request for the data on the temporary storage by a current client, determine if the data matches a previously stored data associated with a previous client;
upon determining that the data matches the previously stored data, refer the current client to the previous client.

6. The system of claim 1, wherein the storage operation comprises an array consisting of: a stream, a byte offset, and a length.

7. A method for directing permanent storage of data by a data storage server (DSS) in a download intensive environment, comprising:
detecting a storage operation on data with respect of a temporary storage;
parsing, by a respective of protocol parser, a protocol of the storage operation;
determining an appropriate stream address of the temporary storage respective of the parsed protocol;
determining if the detected storage operation matches storage operation on a user storage that is associated with a registered client of a virtual file system;
sending a request to the DSS to permanently store the data on a back-end storage (BES), wherein the request comprises the appropriate stream address, upon determining
that the detected storage operation matches a user storage operation of the plurality of user storage operations;
upon receiving a request for the data from the temporary storage;
causing a first client to send a digest value and a first challenge value to a second client;

causing the second client to send an acknowledgment to the first client, the acknowledgement comprising: the digest value, a first response, and a second challenge; causing the first client to send the digest value and a second response; causing the second client to send the digest value, a retrieval key, and a decryption key; and causing the first client to delete encrypted data corresponding to the digest value, wherein access by the first client to encrypted data of the second client is enabled by the retrieval key and the decryption key.

8. The method of claim 7, wherein the protocol of operation is any of: a Simple Mail Transfer Protocol (SMTP), bittorrent, eMule, a File Transfer Protocol (FTP), a Hypertext Transfer Protocol (HTTP), and a Post Office Protocol version 3 (POP3).

9. The method of claim 7, wherein the BES is a content addressable storage (CAS).

10. The method of claim 7, further comprising:

upon receiving a request for the data from the temporary storage by a current client, determining if the data matches a previously stored data associated with a previous client; and upon determining that the data matches the previously stored data, refer the current client to the previous client.

11. The method of claim 7, wherein the storage operation comprises an array consisting of: a stream, a byte offset, and a length.

12. A non-transitory computer readable medium having stored thereon instructions for causing the processor to execute the method according to claim 1.

* * * * *